July 18, 1961

R. A. WEBSTER 2,992,556

FORCE MEASURING INSTRUMENT

Filed April 23, 1958

INVENTOR.
ROBERT A. WEBSTER
BY *Elliott & Pastoriza*
ATTORNEYS

Patented July 18, 1961

2,992,556
FORCE MEASURING INSTRUMENT
Robert A. Webster, Santa Monica, Calif., assignor to Webster Instrument, Inc., a corporation of California
Filed Apr. 23, 1958, Ser. No. 730,371
4 Claims. (Cl. 73—141)

This invention relates generally to force measuring instruments and more particularly to an improved portable type instrument incorporating strain gauges.

This application is a continuation-in-part of my co-pending application, Serial No. 621,311, now abandoned, filed November 9, 1956, and entitled "Force Measuring Instrument."

While the improved features of the present invention will result in a force measuring instrument which may have a variety of different applications, the preferred use of the instrument to be described is for measuring the force between the opposing electrodes of an electric welding machine to provide a rapid indication of the force exerted between these electrodes.

In constructing a force measuring instrument which relies on the use of strain gauges to provide a reading, it is desirable to position the strain gauges on the deformable members at points where the maximum deformation takes place in order to provide the maximum signal. In producing several instruments on a semi-mass production basis, it is not always a simple matter to position the strain gauges in corresponding places on the deformable members even though the deformable members themselves may be made as identical to each other as possible. Consequently, the results obtained when each instrument is separately calibrated may vary substantially.

In the case of strain gauges employed in force measuring instruments such as the type disclosed in the above referred to co-pending application, it is important that the compensating strain gauges for cancelling signals resulting from off-center loading deformations be positioned at points complementary to the positions of the measuring strain gauges. Since the deformable members in most present day strain gauges are such that there is only one most desirable point for securing the strain gauge, the difficulty is again introduced in the proper positioning of the gauges to provide a strain gauge yielding consistent readings, particularly in the case where the gauge is subject to an off-center load.

Bearing the above in mind, it is an important object of the present invention to provide an improved force measuring instrument in which the deformable member is so designed that a relatively large area is provided for attachment of one or more strain gauges and in which attachment of any one of such gauges at any one place in this area will result in a consistent reading.

More particularly, it is an object to provide a strain gauge force measuring instrument of the above type which includes compensating strain gauges to render consistent readings from the instrument notwithstanding off-center loads and in which the heretofore mentioned difficulty in positioning the compensating strain gauges is substantially obviated.

Still another important object is to provide a force measuring instrument including means for preventing damage to the instrument in the event of overloading.

Other more general objects of the invention are to provide an improved force measuring instrument particularly adapted for measuring the opposing force exerted between the electrodes of an electric welding machine, which may be operated by unskilled personnel, and which does not require an appreciable length of time to obtain a force reading.

Briefly, these and other objects and advantages of the invention are attained by providing a base plate and cover member. An annular flange extends upwardly from the periphery of the base plate to support the peripheral edge of the cover member. There is thus defined a pillbox type structure which is relatively flat and easily insertable between the opposing electrodes of an electric welding machine. The cover member may be secured to the annular flange as by a series of screws and the opposing forces to be measured are applied respectively to the top of the cover member and the underside of the base plate.

The deformation resulting from the applied forces is detected on the floor surface of the base plate and to this end a plurality of strain gauges are secured to this floor area. The floor area itself slopes upwardly from the peripheral annular inner edge thereof towards a raised central portion such that a generally conically shaped floor is provided. The ratio of the thickness of the raised central portion to the thickness of the base plate adjacent the inside edge is made equal to the ratio defined by the radius of the base plate from its center to its extreme inner edge divided by the radius of the central portion itself. By dimensioning the base plate in this manner, the annular cross sectional area of the base plate at any radial distance $r$ from the center axis of the base plate is constant over the conical portion of the floor area and thus deformations of this portion will be constant over this area. Thus, the position of the strain gauge thereon is not critical and the signal generated by the gauge at various positions on the conical area will be substantially the same for any given deformation.

The cover member has a central projecting portion arranged to seat on the central raised portion of the base plate in the event forces exceed a certain maximum value. This maximum value is such that the elastic limits of the cover member and base plate are not exceeded so that the instrument itself is protected from overloads.

As in the case of the co-pending application referred to above, four strain gauges are preferably employed and circumferentially spaced ninety degrees about the axis of the base plate on the conical floor. The strain gauges on opposite sides of the center axis are connected in series with each other. The two sets of series connected strain gauges are then connected into two opposite arms of an electrical bridge, the other two arms comprising fixed resistances. By this arrangement, off-center loading will result in deformation which will tend to be canceled out as a consequence of the series connections of the strain gauges.

A better understanding of the invention will be had by referring to a preferred embodiment thereof as disclosed in the accompanying drawings, in which.

Figure 1:
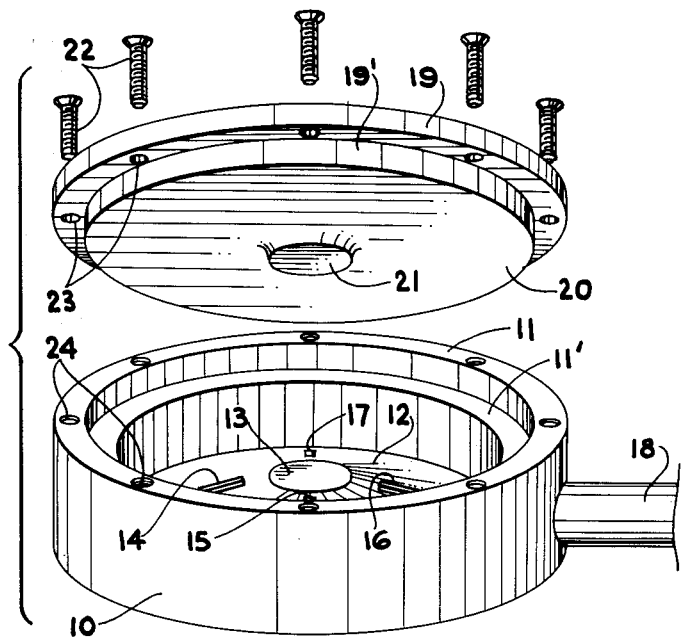
FIGURE 1 is an exploded perspective view of a preferred embodiment of the force measuring instrument of the present invention.

Referring first to FIGURE 1, the instrument comprises a base plate 10 having an annular flange 11 extending upwardly from its peripheral edge and including a step or shoulder 11′ as shown. The flange 11 encloses a conically shaped floor 12. The floor 12 is formed by a surface sloping upwardly from the inner peripheral edge of the base plate towards its center to terminate in a flat central raised portion 13. Suitable strain gauges 14, 15, 16, and 17 are positioned, preferably symmetrically about the axis of the base plate 10, on the conical floor 12. A suitable handle 18 may extend from the lower portion of the base plate.

Co-operating with the base plate 10 and annular flange 11 is a cover member 19 including a shoulder 19′ formed by a reduced diameter portion 20. The shoulder 19′ will mate with the shoulder 11′ of the base plate flange when the cover is positioned on the base plate. The underside 20 of the cover includes a downwardly projecting portion 21 which is arranged to seat on the raised central portion 13 of the base plate structure 10 if deforming forces exerted on the cover and base plate exceed a certain value as will become clearer when the operation of the device is described. A plurality of screws 22 passing through suitable openings 23 in the periphery of the cover member 19 registering with corresponding opening 24 in the flange 11 may be provided for securing the cover member to the top of the base plate flange.

Figure 2:
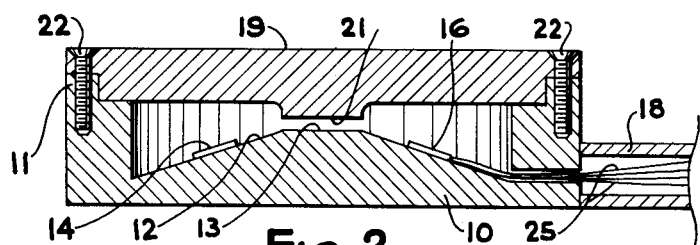
FIGURE 2 is a cross sectional view of the instrument in assembled condition.

Referring now to FIGURE 2, the cover member 19 is shown positioned on top of the base flange 11 and it will be noted that there is left a small space between the raised central portion 13 of the base plate 10 and the center projecting portion 21 of the cover member 19. This projecting portion as explained above is arranged to seat on the central portion 13 before the elastic limit of the structure is exceeded when forces are applied to the top of the cover plate and the underside of the base plate. In the cross sectional view of FIGURE 2, it will be noted that there may be provided a small passage in the lower portion of the flange 11 for passing wires 25 from the various strain gauges through the handle 18 to a suitable circuit and indicating meter.

Figure 3:
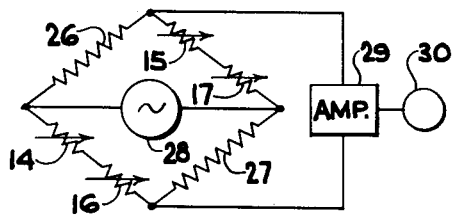
FIGURE 3 is a schematic electrical circuit diagram showing how the various strain gauges are connected to provide a desired signal; and, FIGURE 4 is an enlarged fragmentary cross sectional view, partly schematic, useful in explaining the principle of an important feature of the invention.

Referring to FIGURE 3, there is shown the preferred circuit for indicating the deformation of the base plate 10. The strain gauges 14 and 16 of FIGURES 1 and 2 are connected in series and form one arm of a bridge. The opposite arm of the bridge is similarly formed by connecting the strain gauges 15 and 17 in series. The other two opposite arms include fixed resistances 26 and 27. A source of electrical energy 28 is connected between the junction points of the strain gauge 14 and resistance 26 and the strain gauge 17 and resistance 27 as shown. The resulting voltage signals are taken from the junction points between the strain gauge 15 and fixed resistance 26 and the strain gauge 16 and fixed resistance 27 and fed into an amplifier 29 and thence to an indicating meter 30.

In the operation of the instrument described thus far, positioning of the device between the opposing electrodes of a welding machine, for example, and applying pressure to the upper cover member 19 and base plate 10, will result in a deformation of the floor portion of the base plate. This deformation will result in a substantially equal deformation in all of the four strain gauges if it is assumed that the forces applied in the cover member and base plate are exactly on center—that is, in coincidence with the central axis of the instrument. Thus, if the resistances 14, 15, 16, and 17 are all varied an equal amount in the bridge circuit of FIGURE 3, a potential difference will be established across the amplifier 29 giving rise to a signal 30 which will be a function of the degree of deformation of the base plate.

In the event the load is applied off-center, one of the strain gauges will provide a greater signal than the strain gauge on the opposite side of the axis. Since, however, opposite strain gauges are connected in series, the overall resistance in the one arm of the bridge will be substantially the same as though the load were centrally applied, all as brought out clearly in applicant's co-pending application. Therefore, a relatively consistent signal will be provided even though the forces may be applied off-center.

One of the problems in contructing strain gauge instruments of the type described is the proper positioning of the diametrically opposite strain gauges to the floor area of the base plate such that they will be subject to equal deformations when the forces applied are exactly centered. The instant invention solves this problem by providing a relatively large floor area over which the deformation is substantially the same for any given force applied to the instrument.

In order to provide a constant deformation over a relatively large area, it is necessary that the cross sectional area of the deformed portion at points on the arc where the strain gauge could be attached be the same. In accordance with a feature of the present invention, this is achieved by forming the floor in a conical shape such that the ratio of its thickness at its central portion compared to its thickness at its peripheral annular edge is substantially equal to the ratio of the radius of the base plate floor as compared to the radius of the raised central portion 13.

Figure 4:
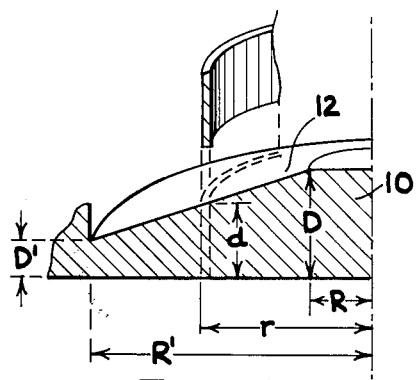

The above will be made clear by reference to FIGURE 4. In FIGURE 4, let the thickness of the central portion at 13 be designated D, the thickness of the conically shaped floor at the peripheral edge designated D′, the radius of the central portion 13 designated R and the radius to the peripheral edge designated R′. The total cross sectional area of my annular section at any radial distance $r$ from the central axis, is then given by $A = 2\pi rd$ where $d$ is the thickness at the particular radius $r$. To insure that this area A will be constant, it is only necessary that the ratio $D/D′ = R′/R$. If these ratios are made equal, as described, it will be immediately evident that $2\pi RD = 2\pi R′D′$ and any intermediate annular cross sectional area $2\pi rd$ will also be equal to these areas.

As a consequence of the foregoing constant cross sectional annular area over the conical portion of the floor the positioning of the strain gauges 14, 15, 16, and 17 on this conical floor is not critical in that the deformation occurring in the conical surface 12 will be substantially the same as long as the strain gauge is positioned at a distance greater than R and less than R′, that is, on some portion of the conical surface itself. Accordingly, it is very much simpler to position the diametrically opposite strain gauges to provide similar readings when forces are applied on-center From the foregoing description it will be apparent that the present invention provides a greatly improved force measuring instrument in which compensation is not only made for off-center loading but in which the structure itself is such that assembly thereof and securement of the strain gauges is simplified. Further, the raised central portion of the base plate also co-operates with the center projecting portion on the underside of the cover to limit deformation of the instrument to ranges within the elastic limits of the structure.

What is claimed is:

1. A force measuring instrument comprising, in combination: a base plate; a cover member; annular flange means extending upwardly from the periphery of said base plate to support the peripheral edge of said cover member; fastening means securing said cover member to said annular flange, said base plate being deformable in response to opposing forces applied normally to the top of said cover member and the underside of said base plate, said cover and base plate having opposing thickened center portions adapted to seat in engagement with each other if said forces exceed a predetermined value, the floor portion of said base plate sloping upwardly from its inner annular peripheral edge towards a thickened central portion to define a conically shaped surface, the slope of said surface being such that the ratio of the thickness of said base plate at its peripheral edge to the thickness of the base plate at its central portion is equal to the ratio of the radius of said central portion to the radius of said floor portion, whereby the area of the surface section defined by $2\pi rd$ is constant, where $r$ is a radius lying between the radius of said central portion and the radius of said floor and $d$ is the thickness of said base plate at said radius $r$; and strain gauge means secured to the floor of said base plate for generating signals which are functions of the deformation of said base plate.

2. A force measuring instrument for indicating the force exerted by opposing welding electrodes, comprising, in combination: a base plate; a cover member; annular flange means extending upwardly from the annular peripheral edge of said base plate to support the peripheral edges of said cover member, said base plate having a raised central portion, the floor of said base plate being conically shaped such that the ratio of the thickness of said raised central portion to the thickness of said base plate at its peripheral edge is substantially equal to the ratio of the radius of said base plate to the radius of said central portion; first, second, third, and fourth strain gauges disposed on said floor of said base plate in positions radially spaced substantially ninety degrees apart; said first and second strain gauges being diametrically opposite each other and said third and fourth strain gauges being diametrically opposite each other; an electrical four arm bridge network including a first fixed resistance in one arm of said bridge; a second fixed resistance in an opposite arm of said bridge; means connecting said first and second strain gauges in series in another arm of said bridge; means connecting said third and fourth strain gauges in series in the remaining arm of said bridge opposite said another arm; an electrical source connected between two diagonal junction points of said bridge; and an indicating means connected between the other two diagonal junction points of said bridge, such that changes in the resistance characteristics of said first, second, third, and fourth strain gauges changes the electrical balance characteristics of said bridge to provide a signal in said indicating means, application of said force at a point spaced from the central axis of said instrument providing substantially the same total resistance changes in said series connected strain gauges as would occur if the force were applied on the central axes of the instrument, whereby said signal is substantially independent of the point of application of said force on said instrument.

3. An insturment according to claim 2, in which said cover member includes a thickened center portion projecting downwardly, the central raised portion of said base plate being disposed a given distance from said thickened center portion of said cover member when said cover member is secured to said base plate, such that deformation of said cover member and base plate is limited by engagement of said center portion and raised portion.

4. A force measuring instrument including: an annular disc-shaped member; annular flange means extending upwardly from the periphery of said member; a cover engaging said annular flange means to hold the peripheral portion of said member stationary when a force is applied normally to one surface of said member at its center to deform said member, said member having a thickened center portion such that the thickness of said member at its peripheral edge divided by its thickness at any lesser radial point from the central axis of the member is substantially equal to the radius of said lesser radial point divided by the radius of said member out to said peripheral edge; and strain gauge elements secured to said member between its thickened center portion and peripheral edge for providing signals indicative of the deformation of said member in response to application of said force.

References Cited in the file of this patent
UNITED STATES PATENTS

| | | |
|---|---|---|
| 2,414,161 | Moore | Jan. 14, 1947 |
| 2,439,146 | Ruge | Apr. 6, 1948 |
| 2,488,349 | Thurston | Nov. 15, 1949 |
| 2,848,892 | Hoffman | Aug. 26, 1958 |

FOREIGN PATENTS

| | | |
|---|---|---|
| 698,793 | Great Britain | Oct. 21, 1953 |